United States Patent

Dedoes

[15] 3,643,746
[45] Feb. 22, 1972

[54] DRAWBAR AND HITCH CONNECTION FOR TRACTOR DRAWN IMPLEMENT

[72] Inventor: Arnold A. Dedoes, 2070 West Eleven Mile Road, Berkley, Mich. 48072

[22] Filed: Jan. 13, 1970

[21] Appl. No.: 2,582

Related U.S. Application Data

[63] Continuation-in-part of Ser. No. 795,853, Feb. 3, 1969.

[52] U.S. Cl. ................................172/445, 172/22, 172/464, 172/478, 172/506, 172/678
[51] Int. Cl. ............A01b 59/042, A01b 63/102, A01b 45/02
[58] Field of Search..................172/464, 466, 452, 465, 478, 172/677, 678, 506, 424, 439; 280/405 B, 479 A, 490 A; 94/50

[56] References Cited

UNITED STATES PATENTS

| | | | |
|---|---|---|---|
| 2,414,072 | 1/1947 | Taft | 172/464 |
| 2,403,360 | 7/1946 | Graham | 176/678 |
| 2,629,306 | 2/1953 | Rusconi | 172/464 |
| 2,658,438 | 10/1953 | Seng | 172/464 |
| 2,667,112 | 1/1954 | Carney | 172/464 |
| 3,527,308 | 9/1970 | Bernotas et al. | 172/464 |
| 2,768,568 | 10/1956 | Heitshu | 172/678 |
| 2,070,425 | 2/1937 | Engel | 172/573 |
| 3,411,589 | 11/1968 | Moe | 172/572 |

FOREIGN PATENTS OR APPLICATIONS

| | | | |
|---|---|---|---|
| 550,023 | 0/1956 | Belgium | 172/464 |
| 966,639 | 8/1957 | Germany | 172/506 |
| 679,253 | 9/1952 | Great Britain | 172/21 |

Primary Examiner—Robert E. Bagwill
Assistant Examiner—C. W. Hanor
Attorney—Hauke, Gifford and Patalidis

[57] ABSTRACT

A drawbar and hitch connection for coupling implements to a tractor and including means for utilizing the power lift unit of the tractor to transfer a portion of the weight of the tractor to the implement and also including means for disconnecting the implement from the tractor without disturbing the weight transfer means.

10 Claims, 10 Drawing Figures

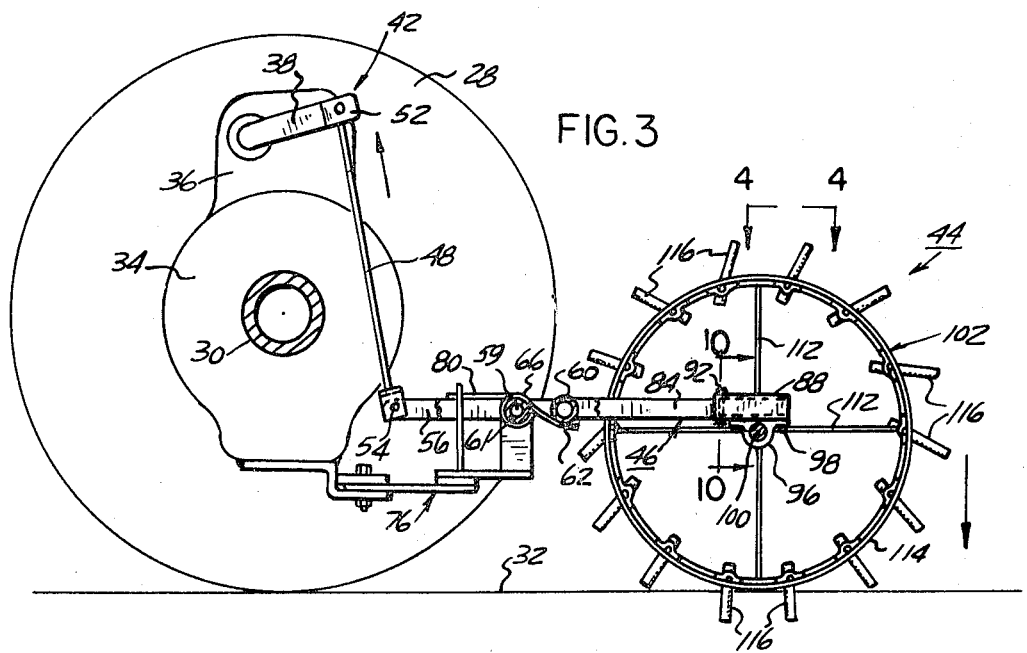
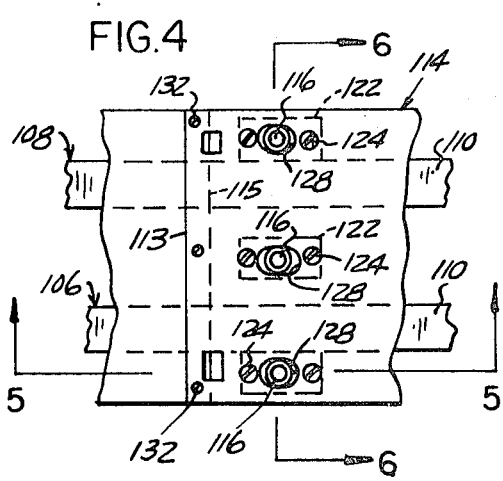
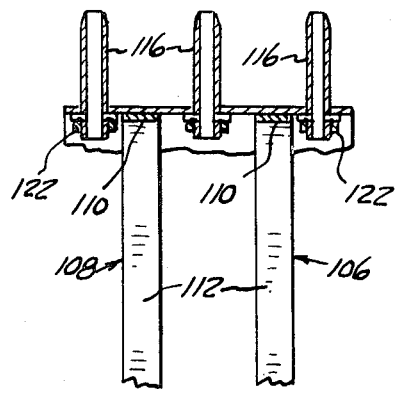
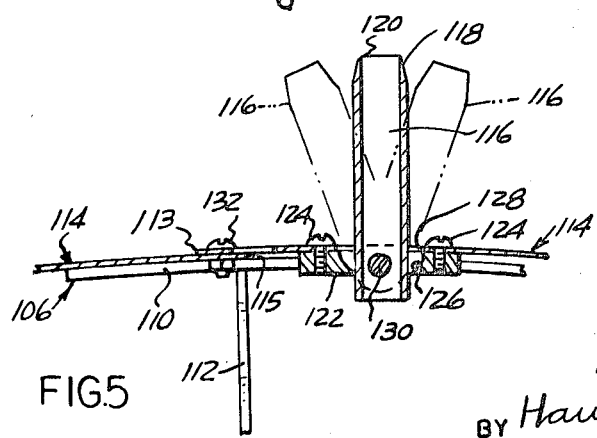
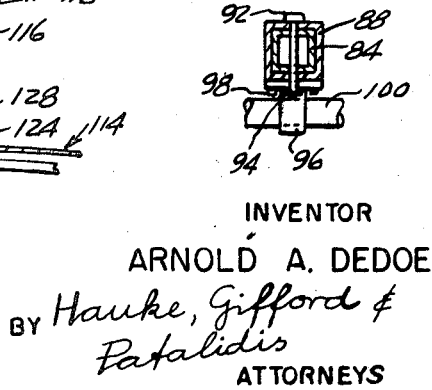
INVENTOR
ARNOLD A. DEDOES
BY Hauke, Gifford &
Patalidis
ATTORNEYS

INVENTOR
ARNOLD A. DEDOES

BY Hauke, Gifford &
Patalidis
ATTORNEYS

DRAWBAR AND HITCH CONNECTION FOR TRACTOR DRAWN IMPLEMENT

REFERENCE TO RELATED APPLICATIONS

The present application is a continuation-in-part application of copending U.S. application Ser. No. 795,853, filed Feb. 3, 1969.

BACKGROUND OF THE INVENTION

1. Field of the Invention

The present invention relates to tractor hitches and more particularly to a combination drawbar and hitch which includes means for transferring a portion of the weight of the tractor to the implement attached to the tractor and means for disconnecting the implement from the tractor without disturbing the weight transfer means.

2. Description of the Prior Art

My aforementioned patent application discloses a hitch assembly for tractors which are provided with power lift mechanism. Such mechanism is commonly provided on tractors to provide means for lifting the implements from the ground. For this reason the mechanism has power only in the lift direction. My previous patent application discloses a hitch which has means for converting the upward movement of the power arms of the mechanism to a downward force on the implement. This permits implements of more lightweight construction to be utilized and insures that regardless of the actual weight of the implement it will be moved along the ground with a uniform downward force.

SUMMARY OF THE PRESENT INVENTION

While the construction disclosed in my previous patent application has proven to be generally satisfactory the present application is directed toward an improvement over that construction. First, the apparatus for changing the upward movement of the power lift arms into a downward force on the implement has been simplified and the hitch and drawbar assembly of the present application includes means for disconnecting the implement without interfering with the weight transfer mechanism. This permits the assembly to be used with several different types of implements with release of one implement and replacement by another being quickly and readily accomplished.

The improved drawbar quick-change hitch assembly of the present invention includes a pivotal drawbar comprising a pair of parallel arms pivotally supported intermediate their ends on a common pivot shaft supported on a tractor hitch bracket. The outer ends of the arms are provided with means to releasably and easily connect an implement, such as an aerator or the like, thereto. The opposite ends of the arms are connected by means of extension rods to a weight transfer mechanism which is power-actuated by means operably connected to the tractor driving mechanism. Normally, the arms, and thus the implement attached thereto, are urged into a raised position above the ground by self-acting energy storing means such as, for instance, torsion springs, the force of which is overcome by the power actuated weight transfer mechanism to lower the implement to the ground and apply a predetermined load thereto. The releasable implement connection is a relatively simple quick-change coupling permitting quick and easy implement conversion without the use of special tools or equipment. The tractor powered weight transfer mechanism of the present invention is of such structure as to be adaptable to a variety of commonly used ground-working implements.

Particular novel features and other obvious advantages of the present improved drawbar and hitch arrangement will become evident by the following detailed description of a preferred embodiment thereof.

BRIEF DESCRIPTION OF THE DRAWINGS

The following detailed description refers in particular to the accompanying drawings illustrating the construction of a preferred embodiment in detail and in which:

FIG. 3 is a transverse cross section through the implement and rear axle of the tractor as seen substantially along line 3—3 in FIG. 2 and showing a complete side elevation of the improved hitch and drawbar connection and associated weight transfer mechanism;

FIG. 4 is a fragmentary top view of one section of the exemplary tractor drawn implement of FIGS. 1-3 as seen in the direction of the arrows 4—4 in FIG. 3;

FIG. 5 is a longitudinal section through the fragmentary portion of the implement shown in FIG. 4 and as seen along line 5—5 thereof;

FIG. 6 is a transverse cross section through the fragmentary portion of the implement shown in FIG. 4 and as seen along line 6—6 thereof;

FIG. 10 is a cross section through the quick-change drawbar coupling of the improved hitch arrangement as seen along line 10—10 of FIG. 3.

DESCRIPTION OF THE PREFERRED EMBODIMENT

Figure 1:
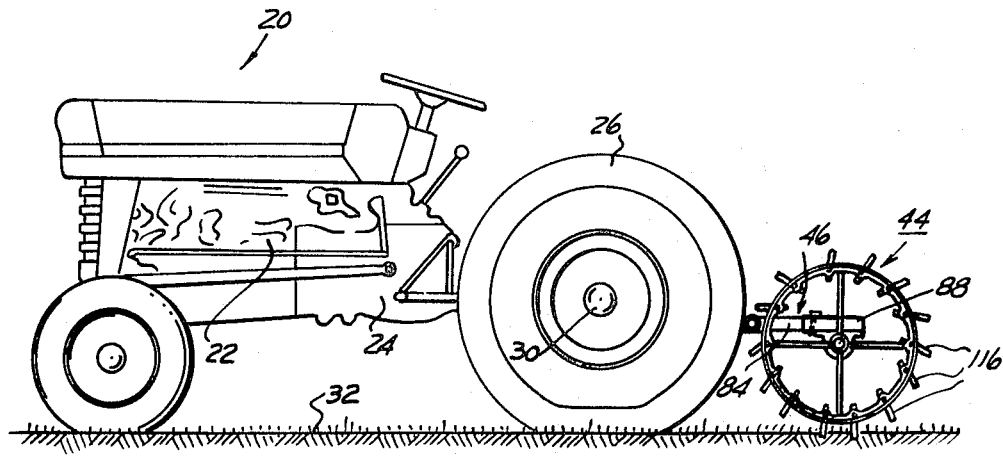
FIG. 1 is a side elevation of the tractor and exemplary implement drawn thereby and incorporating the present invention.
Figure 2:
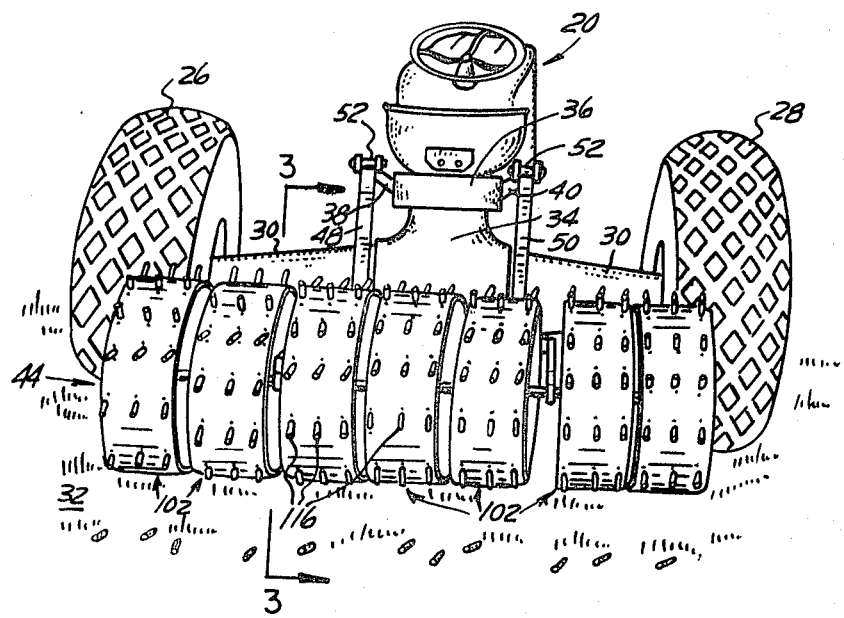
FIG. 2 is a rear view of the tractor and exemplary implement shown in FIG. 1.

With reference now to FIGS. 1 and 2, there is illustrated a towing vehicle, such as a tractor 20, equipped with an engine 22 and transmission 24 to thereby drive a pair of rear driving wheels 26, 28 supported on the rear axle 30 for driving engagement with the ground surface 32. The rear axle 30 intermediate the wheels 26, 28 includes the usual differential drive mechanism enclosed in an enlarged portion 34 of the axle and including a power takeoff within a housing 36, which may be mechanically or hydraulically actuated for pivotal movement of a pair of arms 38 and 40 respectively, suitably connected to opposite sides of the output of the power takeoff for operation of a lift mechanism generally indicated at 42. An implement 44 is drawn by the tractor 20 by means of the present improved hitch and drawbar connection, generally indicated at 46 and connected to the arms 38 and 40.

The lift mechanism 42 is of the type generally provided with tractors and has power only in the upward direction so that it is normally used for lifting an implement or the like. In the present invention the hitch and drawbar 46 act to convert the normal upward movement of the arms 38 and 40 into a downward force on the implement 44. The assembly 46, as more particularly illustrated in FIGS. 3, 8 and 9, includes a pair of actuating rods 48 and 50, each of which is pivotally connected at one end by means of shackles or yokes 52 to a respective one of the pair of links 38, 40. The rods 48, 50 extend in parallel relationship downwardly from the links 38, 40 behind the axle 30, as particularly seen in FIGS. 3 and 9, for pivotal connection of their lower ends by means of a similar shackle or yoke arrangement 54 to a pair of parallel, substantially horizontally disposed, extension rods 56 and 58 whose other ends are secured by welding or the like to a tubular transverse member 60. The extension rods 56 and 58 are pivoted intermediate their ends on a common pivot shaft 59 extending parallel to the transverse member 60 through a supporting tube 61. The transverse member 60 is supported intermediate its ends upon the outwardly extending ends 62 and 64 respectively, which are wound around the tube 61 which supports the pivot shaft 59. The tube 61 is supported on a pair of brackets 72 and 74, which are secured to a support member 76 rigidly attached to the axle 30. The other ends 78 and 80 of the springs 66 and 68 are each nonmovably secured rearwardly to an eyebolt 82 fastened to the bracket support 76 so that the load of the transverse member 60 is torsionally supported by the forward spring ends 62 and 64, which tend to urge the transverse member in an upward direction. Attached to the outer ends of the transverse member 60 are a pair of parallel arms 84 and 86 extending in a horizontal direction rearwardly of the tractor substantially in the same plane as the extension rods 56, 58. The ends of each of the arms 84, 86 are adapted to be telescopically fitted into corresponding tubular members 88 and 90 to which they will be rigidly secured in assembly by a pin 92 or the like, as shown in FIG. 10, which is secured against removal by a cotter pin 94 or the like. Each of the tubular members 88, 90 is attached to a block 96 by means of fasteners 98. The blocks 96 support the axle 100 of the implement 44 for rotation therein so that when the implement 44 is hitched to the rear of the tractor as shown in FIGS. 1–3, the implement 44, when in an operating position, will be rotatably drawn along by the tractor 20.

When no force is exerted on the actuating rods 48, 50 or when the engine of the tractor is shut off, the spring ends 62, 64 of the torsion springs 66, 68 urge the implement upwardly away from the ground surface 32 by force exerted from below, against the transverse member 60 thereby tending to pivot the assembly around the common pivot shaft 59 to which the extension rods 56, 58 are secured, drawing the actuating rods 48, 50 downwardly. Upon operation of the tractor 20, when it is desired to use the implement 44 for working of the ground surface 32, the power takeoff 36 is actuated by the operator of the tractor to pivot the pair of links 38, 40 upwardly, as indicated in FIG. 3, to thereby pull the actuating rods 48, 50 upwardly, which then exert an upward pulling force on the ends of the extension rods 56, 58 to pivot them around the common pivot shaft 59 against the force of the torsion springs 66, 68 to thereby move the implement into contact with the ground surface 32 and loading the torsion springs 66, 68. Depending on the type of implement used and the required load of the implement upon the ground surface, a continuous upward force can be produced at predetermined magnitudes on the actuating rods 48, 50 by the power takeoff 36 to maintain the implement 44 in desired load contact with the ground surface 32, thereby shifting a portion of the weight of the tractor from the rear tractor wheels to the implement 44. If the implement 44 is to be drawn over obstructions in or on the ground surface, the implement can be quickly raised above the ground by releasing the upward pulling force on the actuating rods 48, 50, permitting the stored energy of the torsion springs 56, 58 to act to pivot the implement 44 upwardly above the ground by reverse action of the spring ends 62, 64 on the transverse member 60.

Figure 8:
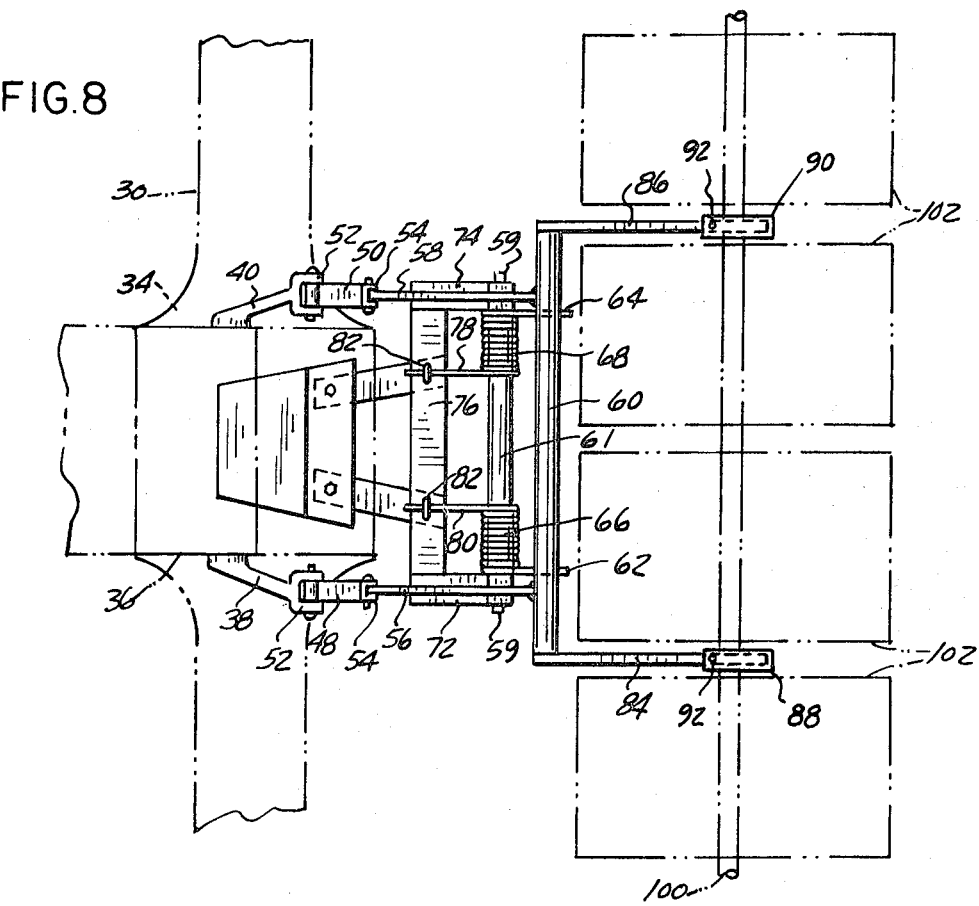
FIG. 8 is a top plan view of the improved hitch and drawbar connection and associated weight transfer mechanism shown in the side view of FIG. 3.
Figure 9:
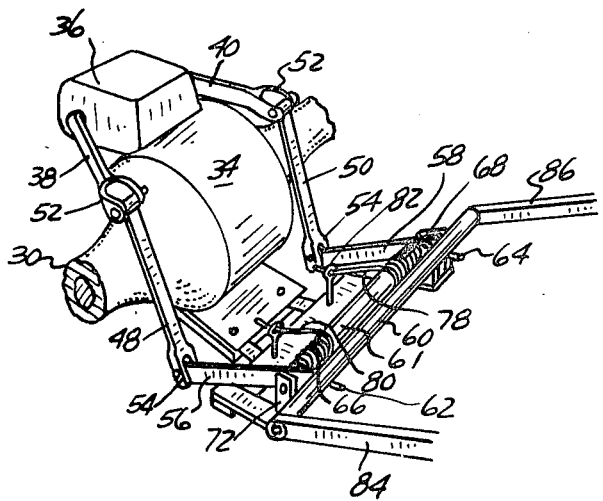
FIG. 9 is a separate fragmentary perspective view of the rear axle of the tractor and associated weight transfer mechanism for the improved hitch and drawbar connection.
Figure 7:
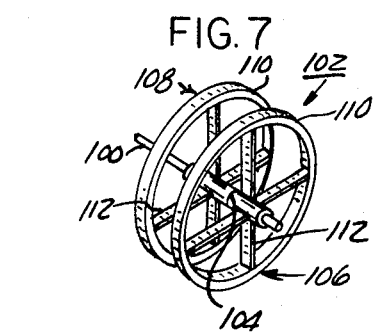
FIG. 7 is a detached perspective illustration of one wheel section of the exemplary implement shown in FIGS. 1-3, with the aerator strip having been removed.

As more particularly illustrated in FIGS. 3–7, the exemplary implement 44 shown herein which is an aerator unit, is comprised of a plurality of identical wheel assemblies 102, all of which may be arranged side by side on a common axle shaft 100 in such manner that an equal number of wheel assemblies 102 are disposed outwardly of the pair of parallel arms 84, 86, as particularly illustrated in FIG. 8. With reference to FIG. 7, each of the identical implement wheel assemblies 102 comprises a central hub portion 104 through which the axle 100 extends and is equipped with a pair of spaced spoked wheels 106, 108, each having a rim portion 110 connected to the hub portion 104 by means of radiating spokes 112.

With particular reference to FIGS. 4–6, the individual wheel assemblies 102 of the implement 44 are adapted to be each equipped with a soil penetrating steel band similar to that disclosed in applicant's U.S. Pat. Nos. 3,221,822 and 3,316,979 for "Soil Penetrating Implement." The wheel assemblies 102 comprise a steel band 114 of a length slightly longer than the circumference of the rim portion 110 of the pair of wheels 106, 108 and of a width larger than the spacing of the wheels 106, 108. The steel band 114 is provided with a plurality of equally radially and transversely spaced soil penetrating elements 116 extending generally in a normal direction from the surface of the steel band, in the fashion of spikes, comprising tubular members having a tapered tip 118 provided with a sharpened edge 120 to permit easy entry into the soil of the ground 32. As shown in FIG. 5, each of the soil penetrating elements 116 is pivotally supported on the steel band 114 by means of a bearing support 122 fastened to the underside of the steel band by screws 124. The bearing support 122 has an enlarged aperture 126 aligned with an enlarged aperture 128 in the steel band to permit the extension of the lower end of the penetrating element therethrough. The lower end of the element 116 is pivotally retained within the bearing support by means of a pivot pin 130 to thereby permit limited pivotal movement of the penetrating element in radial direction within the limits defined by the elongated apertures 126, 128, as indicated in FIG. 5. As seen in FIGS. 4 and 6, the soil penetrating elements 116 are transversely arranged on the steel band 114 in such fashion that, in assembly, one each is located adjacent the outside of each of the wheels 106, 108 so that the respective bearing supports 122 act as retainers to prevent transverse displacement of the steel band along the wheels 106, 108. In assembly, the steel band 114 is drawn around the wheels 106, 108 so that the ends 113, 115 meet and overlap when drawn tight, as shown in FIG. 4. The ends are then secured by screws 132 to retain the steel band 114 tightly around the rim portions 110 of the wheels.

The aerator unit above described and as shown in the drawings is similar to the disclosure in applicant's U.S. Pat. Nos. 3,221,822 and 3,316,979 adapted for the purpose of aerating soil, as described therein, by drawing the aerator over the ground. The pivotal penetrating elements 116 penetrate and are withdrawn from the soil in a substantially straight line without tearing up the ground, which is of particular importance when aerating lawns, golf turfs and other similar ground surfaces. The weight of the tractor is used to force the penetrating elements into the ground, and similarly, by releasing the force on the lift and weight transfer mechanism the aerator unit can be raised from the ground to clear obstacles or for transportation to another location.

As mentioned previously, the implement 44 can be easily interchanged with another implement by means of the quick-change couplings 88, 90, 92 and 94. Thus, for instance, the aerator unit shown herein can be replaced by a grading or packing roller, which does not need water or other means inside the roller to apply the desired weight since this is readily done by the present improved lift and weight transfer mechanism 42 by shifting the weight from the rear tractor wheels to the implement as described herein. Similarly, a soil slicer can be hitched to the arms 84, 86 in the same manner as the aerator unit herein described. It is apparent that other types of quick disconnect means than the particular construction shown can be used without departing from the present invention.

It will be evident from the foregoing description that by means of the present improved arrangement a universal tractor hitch and weight transfer mechanism has been provided for use with various ground working implements adapted to be drawn by the tractor.

While a preferred embodiment has been shown and described, it is obvious that various structural changes may be made therein without departing from the spirit and essential characteristics of the invention, therefore, the present embodiment is to be considered as illustrative only and not restrictive, the scope of the invention being indicated by the appended claims rather than by the foregoing description.

I claim:

1. In combination with a tractor having a drive axle, a pair of ground engaging wheels carried by said drive axle and a driving mechanism retained within said drive axle for driving said wheels, said driving mechanism including a power lift, said combination comprising:

a ground working implement adapted to be drawn by said tractor;

means connecting said tractor and said implement and including force transmitting means operable by said power lift to transfer the weight of said tractor wheels to said implement to maintain said implement in load applying contact with said ground;

means counteracting said force transmitting means to normally urge said implement in a direction away from said ground surface; and said force transmitting means comprising a pair of rotatable links operably connected to said power lift, a pair of actuating rods pivotally connected each at one end to the free ends of each of said links and at the other ends to one end each of a pair of arms, said pair of arms being pivotally connected intermediate their ends to a support secured to said drive axle, each of the other ends of said pair of arms being connected to said implement, said means counteracting said force transmitting means comprising a spring member urging the ends of said arms connected with said implement in a direction away from the ground and toward an inoperative position.

2. The combination as defined in claim 1 and in which said spring member comprises an elongated coil spring mounted with its axis extending parallel to the pivotal axis of said arms.

3. The combination as defined in claim 1, and in which said spring member comprises an elongated coil spring, a rod mounting said spring to extend on an axis parallel to the pivotal axis of said arms, one end of said spring being operably connected with said tractor and the other end being operably connected with said implement to urge said implement upwardly relative to said tractor.

4. In combination with a tractor having a drive axle, a pair of ground engaging wheels carried by the drive axle and a driving mechanism contained within the drive axle for driving said wheels, said tractor having a power lift apparatus, a hitch and weight transfer assembly for attaching an implement to said tractor, said assembly comprising:

a first means attached to said power lift apparatus for converting the upward force produced by said apparatus to a downward force and transmitting said downward force to said implement, a second means intermediate said implement and said first means for attaching and detaching said implement without disturbing said first means, said first means comprising a rotatable link connected to said power lift apparatus, an actuating rod pivotally connected at one end to the free end of said link and at the other end to one end of an arm, said arm being pivotally connected intermediate its ends to a support secured to said drive axle, the other end of said arm being connected to said implement by said second means and a spring member urging the end of said arm attached to said implement in a direction away from the ground and toward an inoperative position.

5. The combination as defined in claim 4 and in which said implement comprises:

an axle and a frame connecting said axle to the rear of said tractor, a cylindrical member rotatably mounted on said axle and freely rotatable with respect thereto whereby as said tractor is moved said cylindrical member rolls along the ground surface behind said tractor.

6. In the combination as defined in claim 4, said arm being provided with a transverse member and said spring member comprising a coil spring wound around the pivot support for said arm in a direction parallel to said transverse member, said coil spring having free ends extending away therefrom in opposite directions and normal to the central axis of said spring, one of said free ends being restrained from movement, the other of said free ends abutting said transverse member to exert a rotational force thereagainst to urge the end of said arm connected with said implement upwardly.

7. In the combination as defined in claim 6, said pivot support for said arm comprising a bracket rigidly secured to said drive axle, said bracket supporting a tube disposed parallel to said transverse member, said arm being attached to a pivot shaft extending through said tube for rotation therein and said coil spring being wound around said tube in preloaded condition.

8. In the combination as defined in claim 4, said second means comprising a tubular member carried by said implement and said other end of said arm adapted to be telescopically retained within said tubular member.

9. In the combination as defined in claim 8, the further provision comprising means securing said other end of said arm within said tubular member.

10. In the combination as defined in claim 9, said means comprising a removable lockpin.

* * * * *